US008267112B2

(12) United States Patent
Liu et al.

(10) Patent No.: US 8,267,112 B2
(45) Date of Patent: Sep. 18, 2012

(54) AUTOMATIC WATER DISTRIBUTOR

(75) Inventors: Zhibin Liu, Shen Zen (CN); Weidong Qiu, Shen Zen (CN)

(73) Assignee: Globe Union Industrial Corp., Taichung (TW)

( * ) Notice: Subject to any disclaimer, the term of this patent is extended or adjusted under 35 U.S.C. 154(b) by 152 days.

(21) Appl. No.: 12/851,878

(22) Filed: Aug. 6, 2010

(65) Prior Publication Data
US 2012/0031514 A1 Feb. 9, 2012

(51) Int. Cl.
*G05D 11/02* (2006.01)
*F16K 11/00* (2006.01)
(52) U.S. Cl. .................................. 137/119.04; 137/883
(58) Field of Classification Search ............. 137/119.01, 137/119.03, 119.04, 119.05, 119.06, 119.08, 137/118.01, 118.06, 118.07, 597, 625.48, 137/512, 512.5, 529, 542, 543.13, 861, 871, 137/872, 883
See application file for complete search history.

(56) References Cited

U.S. PATENT DOCUMENTS

| | | | | |
|---|---|---|---|---|
| 2,245,041 A * | 6/1941 | McCurdy | .......................... | 239/25 |
| 2,772,690 A * | 12/1956 | Mercier et al. | ........... | 137/119.04 |
| 3,149,475 A * | 9/1964 | Gislason | .......................... | 62/197 |
| 3,756,273 A * | 9/1973 | Hengesbach | ................. | 137/540 |
| 4,193,418 A * | 3/1980 | Meyer | ....................... | 137/118.01 |
| 5,881,754 A * | 3/1999 | Wei | ........................... | 137/119.04 |
| 6,263,919 B1 * | 7/2001 | Knapp | ....................... | 137/625.4 |
| 6,341,617 B1 * | 1/2002 | Wilson | ...................... | 137/119.04 |
| 6,561,210 B2 * | 5/2003 | Hsieh et al. | ............. | 137/119.04 |
| 6,748,965 B2 * | 6/2004 | Lee | ........................... | 137/118.01 |
| 6,920,892 B2 * | 7/2005 | Agresta et al. | ........... | 137/119.04 |
| 7,334,599 B2 * | 2/2008 | Shieh | ....................... | 137/119.05 |
| 2010/0012197 A1 * | 1/2010 | Liu | ........................... | 137/119.04 |
| 2012/0152387 A1 * | 6/2012 | Chang et al. | ............. | 137/625.48 |

FOREIGN PATENT DOCUMENTS

CN    201186249 Y * 1/2009
* cited by examiner

*Primary Examiner* — Craig Schneider
*Assistant Examiner* — Jonathan Waddy

(57) ABSTRACT

An automatic water distributor contains a body including a first outflow cavity, a second outflow cavity, at least one first and second inlets; the first inlet communicating with the first outflow cavity through a hole in the body; the body including a spaced fringe with a through aperture to space the first and the second inlets; a valve core inserting through the hole and the through aperture and including a first segment and a second segment; a water plug sliding on the valve core; a first resilient element fitted on the valve core, including two ends abutting against the first segment and the water plug respectively; a second resilient element fitted on the valve core and including two ends abutting against the second segment and the spaced fringe individually, wherein an elasticity coefficient of the second resilient element is less than that of the first resilient element.

15 Claims, 10 Drawing Sheets

| outflow pressure | 20PSI | | | 40PSI | | | 60PSI | | | 80PSI | | |
|---|---|---|---|---|---|---|---|---|---|---|---|---|
| State | Before | During | After | Before | During | After | Before | During | After | Before | During | After |
| Conventional automatic water distributor A | 54.6 | 67 | 53.3 | 58.4 | 68 | 57 | 62.3 | 71 | 59.1 | 65 | 74 | 61 |
| Conventional automatic water distributor B | 52.5 | 62 | 49 | 56 | 62.9 | 45.8 | 62 | 67.4 | 60.2 | 64.6 | 73.6 | 60.1 |
| Automatic water distributor 1 of the present invention | 53 | 55.6 | 56.8 | 56.3 | 58.9 | 61.3 | 58 | 64 | 65.7 | 60.2 | 67.3 | 67.7 |

FIG. 10

AUTOMATIC WATER DISTRIBUTOR

BACKGROUND OF THE INVENTION

1. Field of the Invention

The present invention relates to an automatic water distributor.

2. Description of the Prior Art

A conventional automatic water distributor is used in a shower faucet to distribute water by ways of water pressure so that the water sprays from the shower faucet or a shower. However, when switching a water spray type, a water hammer effect will occur to generate shock and noise. In addition, when at a lower pressure, the water can not be distributed well.

Therefore, an improved automatic water distributor is developed and disclosed in CN Patent No. 201186249Y.

Nevertheless, when the water operates during water distributing process, e.g., the water plug closes a hole again after it disengages from the hole, and the water plug is pushed by a spring to return back to its original position quickly and impacts a raised fringe of a fitting pipe to generate shock and water hammer noises.

Moreover, when the improved automatic water distributor is at a lower pressure, it is limited by a spring without being pushed upward to disengage from the hole, hence the automatic water distributor can not distribute water well when the faucet sprays water or the automatic water distributor is switched in a faucet mode.

The present invention has arisen to mitigate and/or obviate the afore-described disadvantages.

SUMMARY OF THE INVENTION

The primary object of the present invention is to provide an automatic water distributor which is capable of overcoming the shortcomings of the conventional automatic water distributor.

To obtain the above objectives, a faucet connecting structure provided by the present invention contains a body including a first outflow cavity and a second outflow cavity; the body also including at least one first inlet and at least one second inlet fixed between inner peripheral sides of the first and the second outflow cavities; the first inlet communicating with the first outflow cavity through a hole in the body; the body including a spaced fringe formed on an inner peripheral surface thereof to space the first and the second inlets, and the spaced fringe including a through aperture arranged thereon;

a valve core inserting through the hole and the through aperture and including a first segment located at the first outflow cavity and a second segment located at the second outflow cavity;

a water plug being capable of sliding on the valve core of the first outflow cavity;

a first resilient element fitted on the valve core, including two ends abutting against the first segment and the water plug of the valve core respectively, and providing a shock absorbing effect when being compressed by the water plug;

a second resilient element fitted on the valve core and including two ends abutting against the second segment of the valve core and the spaced fringe of the body individually, wherein an elasticity coefficient of the second resilient element is less than that of the first resilient element, the second resilient element pushes the valve core to move downward by using its returning elasticity so that the water plug on the valve core closes the hole of the body.

BRIEF DESCRIPTION OF THE DRAWINGS

FIG. 10 shows a test result of water hammer noises of the automatic water distributor of the present invention, a conventional automatic water distributor, and another conventional automatic water distributor.

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

Figure 1:
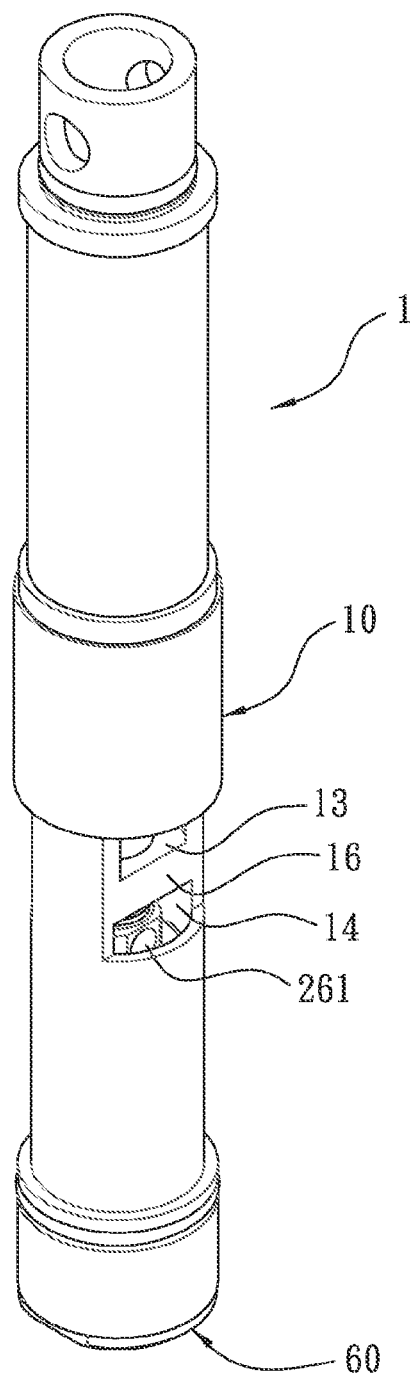
FIG. 1 is a perspective view showing the assembly of an automatic water distributor according to a preferred embodiment of the present invention.
Figure 2:
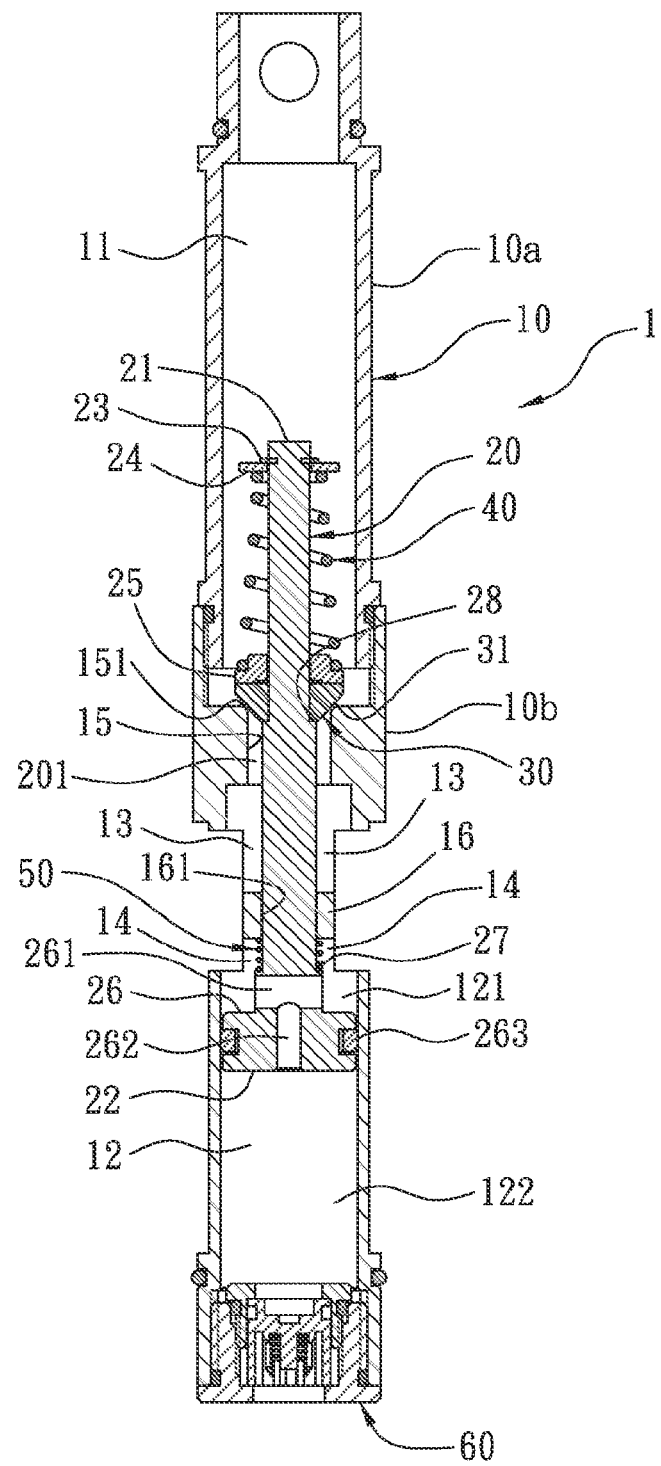
FIG. 2 is a cross sectional view showing the assembly of the automatic water distributor according to the preferred embodiment of the present invention.
Figure 3:
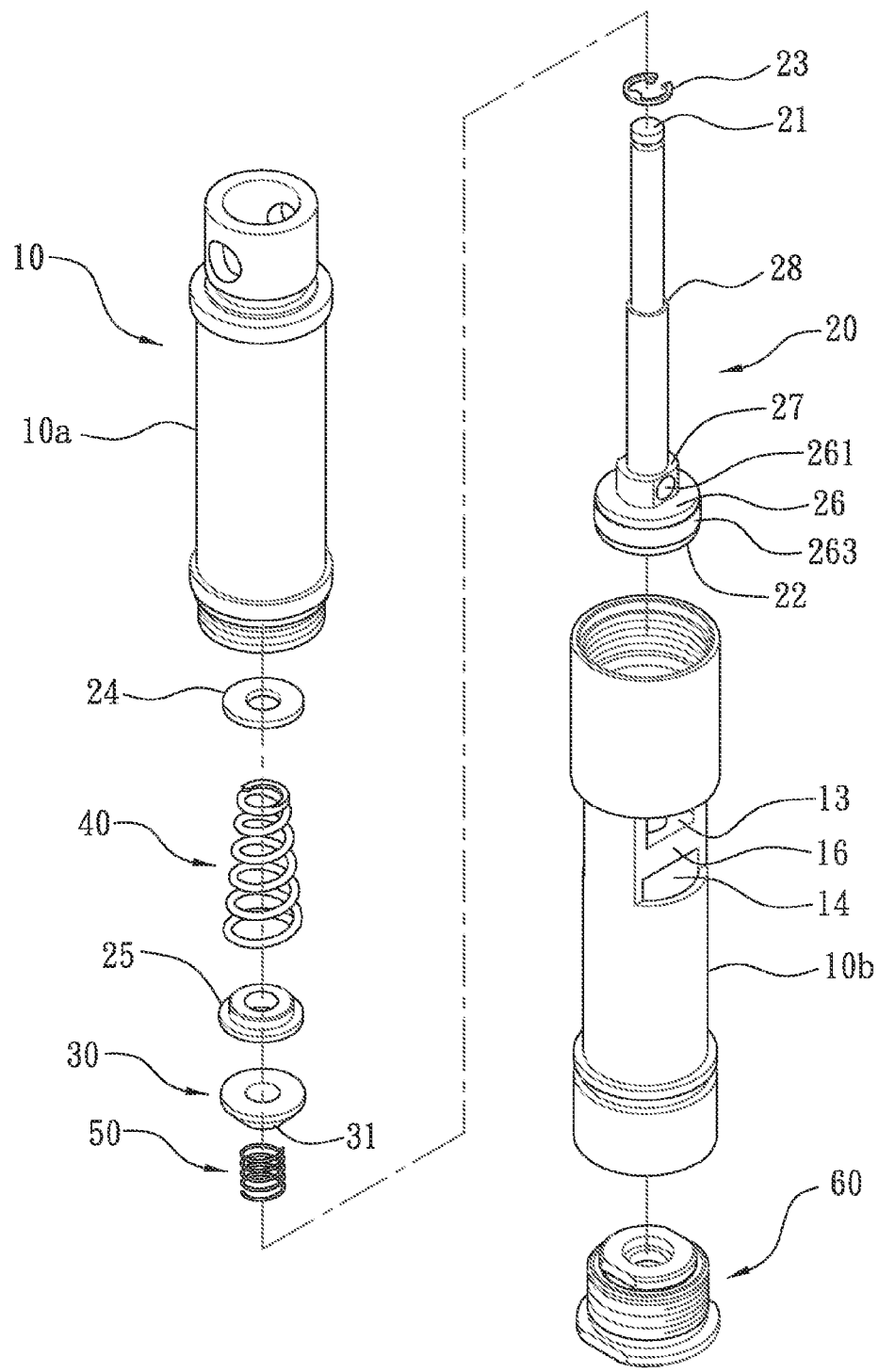
FIG. 3 is a perspective view showing the exploded components of the automatic water distributor according to the preferred embodiment of the present invention.

Referring to FIGS. 1-3, an automatic water distributor 1 according to a preferred embodiment of the present invention comprises a cylindrical body 10, a valve core 20, a water plug 30, a first resilient element 40, a second resilient element 50, and a check valve 60.

Figure 4:
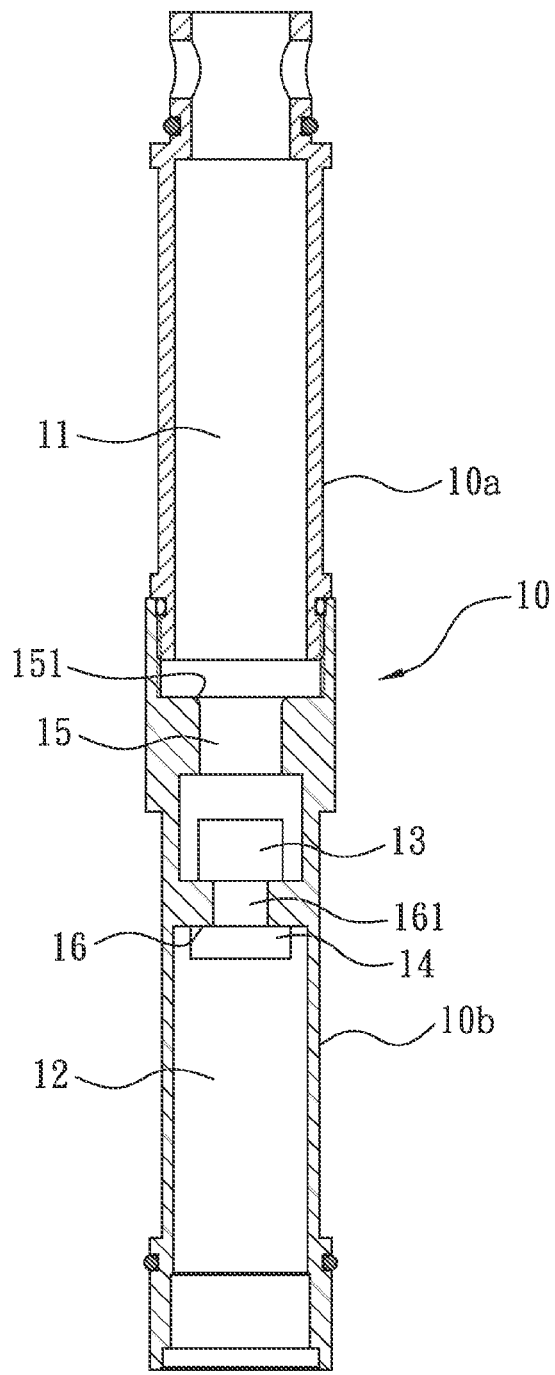
FIG. 4 is a cross sectional view showing the assembly of a body of the automatic water distributor according to the preferred embodiment of the present invention.

The body 10, as shown in FIG. 4, includes a first outflow cavity 11 disposed on an upper side thereof and a second outflow cavity 12 mounted on a lower side thereof; the body 10 includes two symmetrical first inlets 13 and two symmetrical second inlets 14 fixed between inner peripheral sides of the first and the second outflow cavities 11, 12; the first inlet 13 communicates with the first outflow cavity 11 through a hole 15 in the body 10; the body 10 also includes a spaced fringe 16 formed on an inner peripheral surface thereof to space the first and the second inlets 13, 14, and the spaced fringe 16 includes a through aperture 161 arranged thereon; the first inlet 14 communicates with the second outflow cavity 12.

The body 10 further includes an upper part member 10a and a lower part member 10b, both of which are screwed with each other, wherein an interior of the upper part member 10a is used to define most part of the first outflow cavity 11, and an interior of the lower part member 10b is applied to define the second outlet cavity 12, the lower part member 10b includes the first inlet 13, the second inlet 14, the hole 15 and the spaced fringe 16 arranged thereon.

The valve core 20 is formed in a rod shape to insert through the hole 15 and the through aperture 161 and includes a first segment 21 located at the first outflow cavity 11 and a second segment 22 located at the second outflow cavity 12, wherein the valve core 20 is away from the hole 15 to form a slit 201 defined between the valve core 20 and the hole 15 so as to communicate the first inlet 13 with the first outflow cavity 11.

The first segment 21 of the valve core 20 includes a retaining ring 23 disposed thereon, a stop piece 24 and a positioning seat 25, both of which are fitted on the first segment 21, and the retaining ring 23 serves to stop the stop piece 24 from moving upward.

The second segment 22 of the valve core 20 includes a piston-shaped fitting portion 26 mounted thereon to slide upward and downward along the second outflow cavity 12 of the body 10 so as to divide the second outlet cavity 12 into an upper room 121 and a lower room 122, and volumes of the upper room 121 and the lower room 122 are changed with a movement of the fitting portion 26. The fitting portion 26 includes a radial channel 261 and an axial channel 262 to communicate with the radial channel 261, and the radial channel 261 communicates with the second inlet 14 through the upper room 121, the axial channel 262 communicates with the lower room 122.

The valve core 20 includes a fixing periphery 27 fixed on an outer surface thereof above the radial channel 261, and includes a stepped rim 28 formed on a middle section thereof.

To slide the fitting portion 26 of the valve core 20 in the second outflow cavity 12 smoothly, the fitting portion 26 is provided a sliding sleeve 263 secured on an outer peripheral side thereof, and the sliding sleeve 263 has good sliding property so as to contact with the second outflow cavity 12 and to slide in the second outflow cavity 12 smoothly.

The water plug 30 is capable of sliding on the valve core 20 of the first outflow cavity 11. In this embodiment, the water plug 30 is defined between the stepped rim 28 and the positioning seat 25 of the valve core 20, axially slides upward and downward along the valve core 20, and is limited by the stepped rim 28.

The water plug 30 is made of plastic material and formed in a cone shape to define a conical closing fence 31 to close the conical peripheral face 151 formed on a top end of the hole 15 of the body 10.

The first resilient element 40 is a compression spring in this embodiment to be fitted on the valve core 20, and includes two ends abutting against the stop piece 24 and the positioning seat 25 of the first segment 21 of the valve core 20 respectively, after the first resilient element 40 is biased against the positioning seat 25, its returning elasticity pushes the water plug 30 so that the water plug 30 retains on the stepped rim 28 as shown in FIG. 2.

Figure 8:
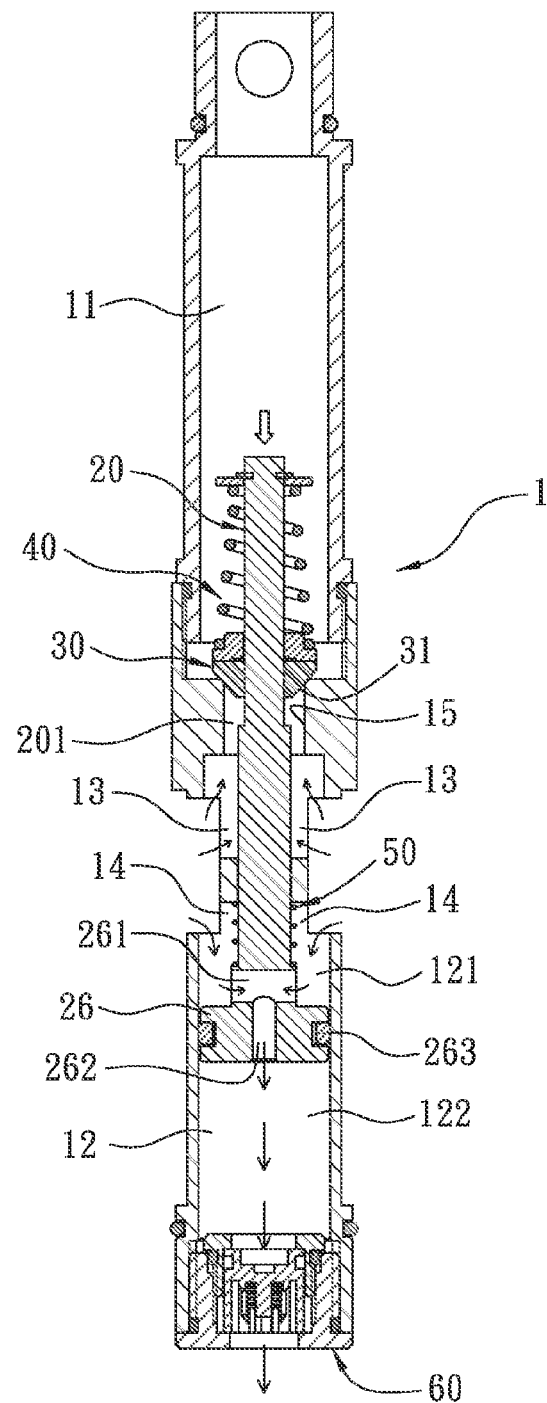
FIG. 8 is another cross sectional view showing the operation of the automatic water distributor according to the preferred embodiment of the present invention.

Furthermore, when the water plug 30 slides upward along the valve core 20 to compress the first resilient element 40, the returning elasticity of the first resilient element 40 is used to absorb shock as illustrated in FIG. 8.

The second resilient element 50 is a compression spring in this embodiment to be fitted on the valve core 20, and includes two ends abutting against the fixing periphery 27 of the first segment 21 of the valve core 20 and the spaced fringe 16 of the body 10 individually, wherein an elasticity coefficient of the second resilient element 50 is less than that of the first resilient element 40, the second resilient element 50 pushes the valve core 20 to move downward by using its returning elasticity so that the water plug 30 on the valve core 20 closes the hole 15 of the body 10 as illustrated in FIG. 2 to stop water flowing into the first outflow cavity 11.

Figure 7:
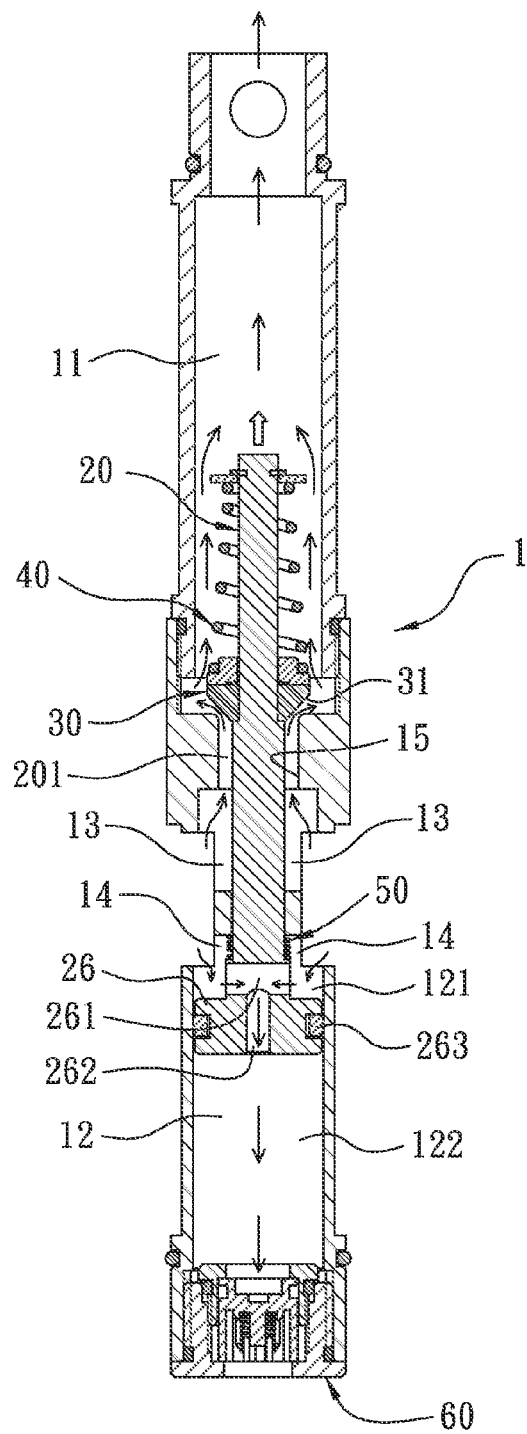
FIG. 7 is a cross sectional view showing the operation of the automatic water distributor according to the preferred embodiment of the present invention.

It is to be noted that a size of the second resilient element 50 is smaller than that of the first resilient element 40, and the elasticity coefficient of the second resilient element 50 is less than that of the first resilient element 40, hence the second resilient element 50 is compressed in a normal state, and the first resilient element 40 is not compressed in the normal state as shown in FIG. 2, such that the water plug 30 is used to close the hole 15 by ways of the second resilient element 50 so that although a water pressure in the first inlet 13 of the automatic water distributor 1 is low, the water pressure still allows the valve core 20 to move upward so that the water plug 30 disengages from the hole 15 as illustrated in FIG. 7. Thereby, the automatic water distributor 1 is capable of distributing water well at a lower pressure.

The check valve 60 is screwed in the body 10 relative to an outlet end of the second outflow cavity 12 to prevent the water from flowing back to the second outflow cavity 12.

Figure 5:
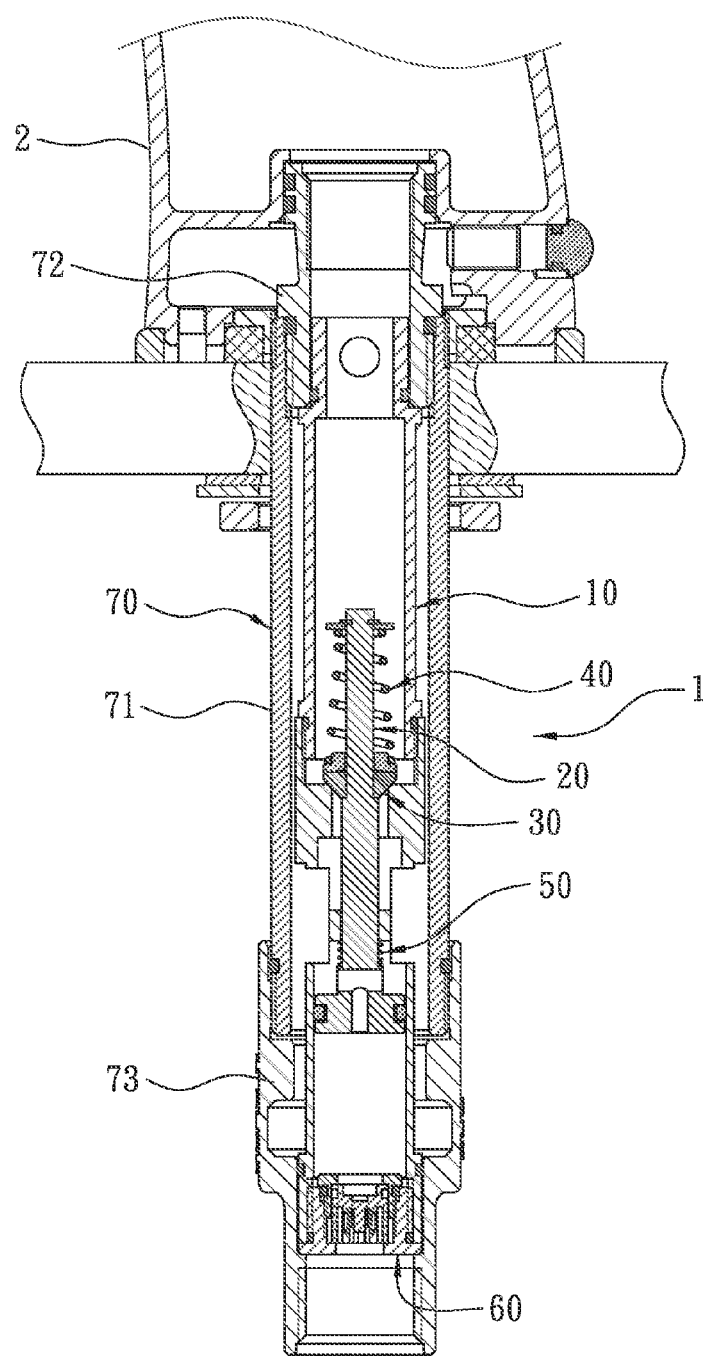
FIG. 5 is a cross sectional view showing the automatic water distributor being installed onto an outlet faucet according to the preferred embodiment of the present invention.
Figure 6:
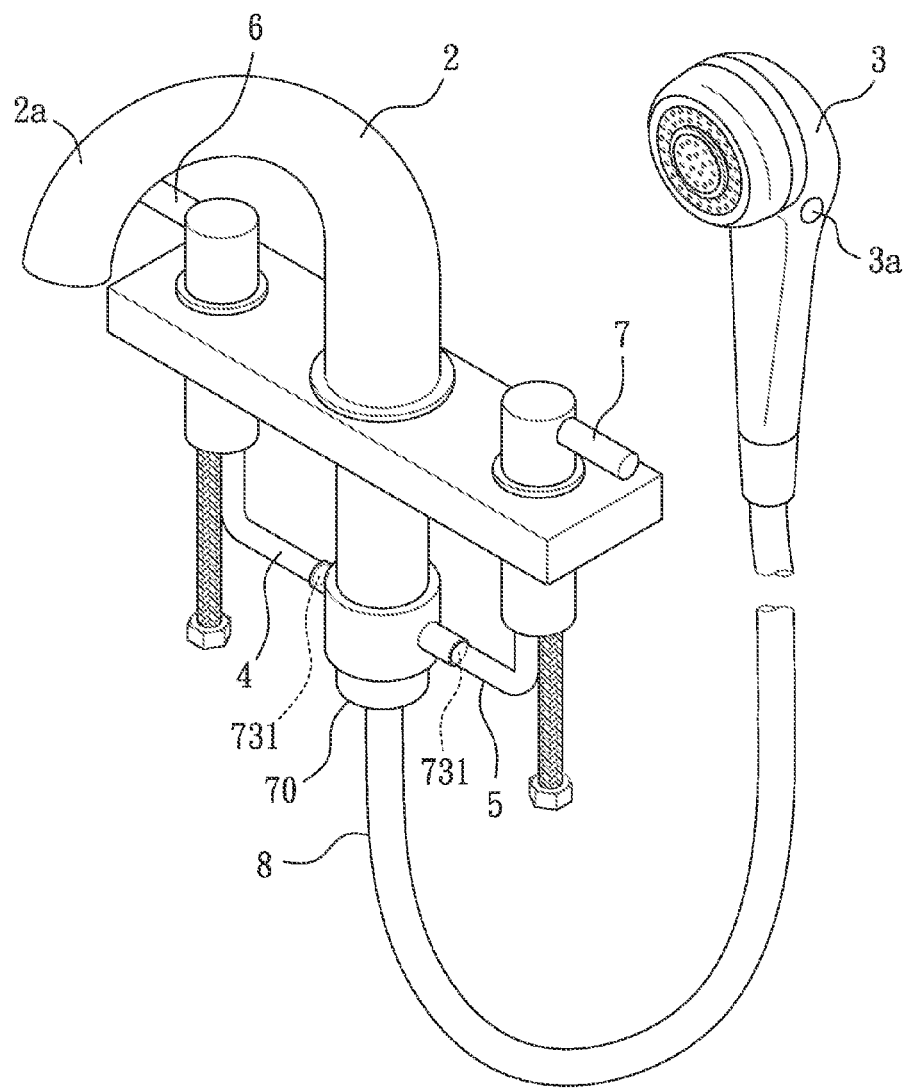
FIG. 6 is a perspective view showing the automatic water distributor being installed onto an outlet faucet according to the preferred embodiment of the present invention.

With reference to FIGS. 5 and 6, the automatic water distributor 1 further includes a housing 70 to receive the body 10, wherein the housing 70 includes an upper housing part 71, a valve holder 72 fitted on a top end of the upper housing part 71, and a lower housing part 73 fitted onto a bottom end of the upper housing part 71; the valve holder 72 serves to receive a top end of the body 10 and to communicate with a first watering device. In this embodiment, the first watering device is an outlet faucet 2; the lower housing part 73 is capable of receiving a bottom end of the body 10 and to communicate with a second watering device, and the second watering device is a shower 3 in this embodiment, the shower 3 includes a button 3a, the lower housing part 73 includes at least one third inlet 731 arranged on an inner wall thereof. The lower housing part 73 is provided two third inlets 731 in this embodiment to communicate with a first inflow pipe 4 to flow cold water and a second inflow pipe 5 to flow hot water.

The automatic water distributor 1 is also installed on a shower faucet as prior art, and the shower faucet includes the outlet faucet 2, the upper housing part 71 of the automatic water distributor 1 is screwed on a bottom end of the outlet faucet 2, and the valve holder 72 is connected with the outlet faucet 2; the automatic water distributor 1 further includes a cold-water control lever 6 and a hot-water control lever 7 to control the cold and the hot waters to flow into the first inflow pipe 4 and the second inflow pipe 5 respectively; the automatic water distributor 1 further includes a hose 8 connected on an opening of a bottom end of the lower housing part 73 and the shower 3 coupled on a distal end of the hose 8; thereby when the cold-water control lever 6 and the hot-water control lever 7 are not turned on, the water plug 30 moves downward with the valve core 20 pressed by the second resilient element 50 to close the hole 15 as illustrated in FIG. 2.

Referring to FIG. 7, while the cold-water control lever 6 or the hot-water control lever 7 is turned on, the water from the first inflow pipe 4 or the second inflow pipe 5 flows into the first inlet 13 and the second inlet 14 of the body 10 via the third inlets 731 and a gap between the housing 70 and the body 10, thereafter the water further flows into an internal space of the body 10 below the water plug 30, such as the second outflow cavity 12, and the hose 8 and the shower 3. In the meantime, if the controlling button 3a of the shower 3 is not pressed, the water flowing into the automatic water distributor 1, the hose 8, and the shower 3 accumulates pressure quickly, and when the pressure is over the returning elasticity of the second resilient element 50, the valve core 20 is pushed to slide upward so that the water plug 30 disengages from the hole 15, hence the water is guided toward a top end of the outlet faucet 2 to further flow out of a spout 2a, and the second resilient element 50 is compressed completely to accumulate the largest returning elasticity.

Figure 9:
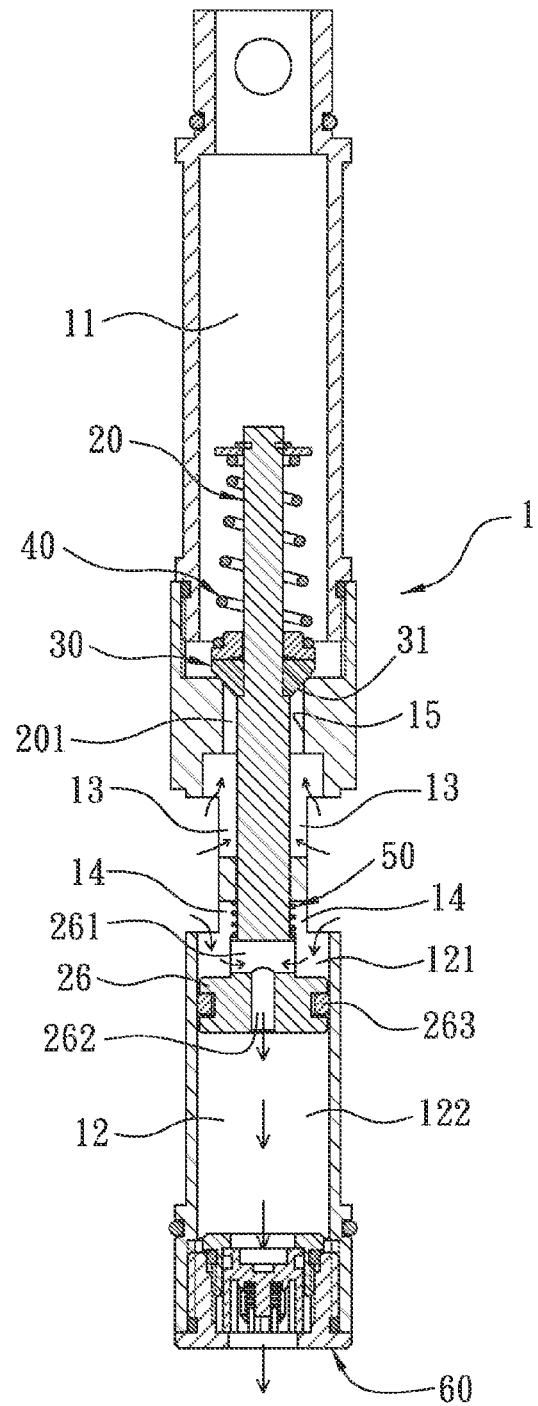
FIG. 9 is another perspective view showing the assembly of an engaging member of a faucet connecting structure according to a second embodiment of the present invention.

Referring further to FIG. 9, when the controlling button 3a of the shower 3 is pressed, the water in the automatic water distributor 1 is guided toward the shower 3 to be further sprayed so that a water pressure below the water plug 30 is released greatly, and the returning elasticity of the second resilient element 50 to push the valve core 20 to move downward is more than the water pressure to push the water plug 30 and the valve core 20 so as to move downward so that the valve core 20 and the water plug 30 are actuated to move downward, and the water plug 30 further moves back to close the hole 15, thus stopping the water flowing into the first outflow cavity 11. Therefore, when the shower 3 is switched to spray water, the automatic water distributor 1 is used to start water spray from the outlet faucet 2, thereby switching water distribution automatically.

It is to be noted that when the water supply of the automatic water distributor 1 is switched from the spout 2a of the outlet faucet 2 to the shower 3, even though the water plug 30 moves downward with the valve core 20 to impact the conical peripheral face 151 of the hole 15 of the body 10 and to stop a downward movement, the valve core 20 still moves downward because the water plug 30 is fitted on the valve core 20, hence the first resilient element 40 is engaged by the water plug 30 and the stop piece 24 which slides upward along the valve core 20 to be pressed gradually as shown in FIG. 8, such that a reaction of the water plug 30 is absorbed by the returning elasticity of the first resilient element 40 to obtain a shock absorbing effect, thus eliminating impact and water hammer noises resulting from the water plug 30.

In a FIG. 10, a test result of water hammer noises of the automatic water distributor 1 of the present invention, a conventional automatic water distributor A, and another conventional automatic water distributor B is shown, wherein an outflow pressure denotes the outflow pressure of the spout 2a of the outlet faucet 2, and four kinds of outflow pressures 20 PSI, 40 PSI, 60 PSI, and 80 PSI are tested. A word of "Before" means a watering state of the spout 2a, and a noise made during the watering state of the spout 2a is tested; a word of "During" means an instant switch from the watering state of the spout 2a to a water state of the shower 3, and a noise made during the instant switch is tested; and a word of "After" denotes a watering state of the shower 3, and a noise made during the watering state of the shower 3 is tested.

From the test result of the FIG. 10, the noses made during the instant switches of the conventional automatic water distributors A and B are larger than the noise made from the watering states of the spout 2a and the shower 3, and the noise made during the instant switch of the spout 2a and the shower 3 of the automatic water distributor 1 of the present invention is lowered greatly. Taking the outflow pressure 20 PSI in a lower pressure state for example, a decibel of the noise of the automatic water distributor of the present invention is 55.6 lower than 67 and 62 decibels of the noises of the conventional automatic water distributors A, B. Likewise, taking the outflow pressure 80 PSI in a high pressure state for example, the decibel of the noise of the automatic water distributor of the present invention is 67.3 lower than 74 and 73.6 decibels of the noises of the conventional automatic water distributors A, B, hence the noise of the automatic water distributor is decreased effectively.

Therefore, the first resilient element 40 is used to cooperate with the water plug 30 to absorb impact force and to eliminate noise made during watering switch. In addition, the water plug 30 allows to close the hole 15 to eliminate water hammer effect.

While we have shown and described various embodiments in accordance with the present invention, it is clear to those skilled in the art that further embodiments may be made without departing from the scope of the present invention.

What is claimed is:

1. An automatic water distributor comprising
a body including a first outflow cavity and a second outflow cavity; the body also including at least one first inlet and at least one second inlet fixed between inner peripheral sides of the first and the second outflow cavities; the first inlet communicating with the first outflow cavity through a hole in the body; the body including a spaced fringe formed on an inner peripheral surface thereof to space the first and the second inlets, and the spaced fringe including a through aperture arranged thereon;
a valve core inserting through the hole and the through aperture and including a first segment located at the first outflow cavity and a second segment located at the second outflow cavity;
a water plug being capable of sliding on the valve core of the first outflow cavity;
a first resilient element fitted on the valve core, including two ends abutting against the first segment and the water plug of the valve core respectively, and providing a shock absorbing effect when being compressed by the water plug;
a second resilient element fitted on the valve core and including two ends abutting against the second segment of the valve core and the spaced fringe of the body individually, wherein an elasticity coefficient of the second resilient element is less than that of the first resilient element, the second resilient element pushes the valve core to move downward by using its returning elasticity so that the water plug on the valve core closes the hole of the body.

2. The automatic water distributor as claimed in claim 1, wherein the body further includes an upper part member and a lower part member, both of which are screwed with each other, an interior of the upper part member is used to define most part of the first outflow cavity, and an interior of the lower part member is applied to define the second outlet cavity, the lower part member includes the first inlet, the second inlet, the hole and the spaced fringe arranged thereon.

3. The automatic water distributor as claimed in claim 1, wherein the second segment of the valve core includes a fitting portion mounted thereon to slide upward and downward along the second outflow cavity of the body so as to divide the second outlet cavity into an upper room and a lower room, and volumes of the upper room and the lower room are changed with a movement of the fitting portion, the fitting portion includes a radial channel and an axial channel to communicate with the radial channel, and the radial channel communicates with the second inlet through the upper room, the axial channel communicates with the lower room.

4. The automatic water distributor as claimed in claim 3, wherein the valve core includes a fixing periphery fixed on an outer surface thereof above the radial channel so that the two ends of the second resilient element are biased against the fixing periphery and the spaced fringe respectively.

5. The automatic water distributor as claimed in claim 1 further including a check valve is screwed in the body relative to an outlet end of the second outflow cavity.

6. The automatic water distributor as claimed in claim 1, wherein the first segment of the valve core includes a retaining ring disposed thereon, a stop piece and a positioning seat, both of which are fitted on the first segment, and the two ends of first resilient element are biased against the stop piece and the positioning seat, the stop piece is limited by the retaining ring, and the positioning seat abuts against the water plug.

7. The automatic water distributor as claimed in claim 1, wherein the valve core includes a stepped rim disposed thereon to be abutted by the water plug being biased by the first resilient element.

8. The automatic water distributor as claimed in claim 1, wherein the water plug is formed in a cone shape to define a conical closing fence to close the conical peripheral face formed on a top end of the hole of the body.

9. The automatic water distributor as claimed in claim 1 further comprising a housing to receive the body, wherein the housing includes at least one third inlet arranged thereon to communicate with the first inlets and the second inlet.

10. The automatic water distributor as claimed in claim 9, wherein the housing includes an upper housing part, a valve holder fitted on a top end of the upper housing part, and a lower housing part fitted onto a bottom end of the upper housing part; the valve holder serves to receive a top end of the body and to communicate with a first watering device; the lower housing part is capable of receiving a bottom end of the body and to communicate with a second watering device.

11. The automatic water distributor as claimed in claim 10, wherein the third inlet is arranged on the lower housing part.

12. The automatic water distributor as claimed in claim 1, wherein the first resilient element is a compression spring.

13. The automatic water distributor as claimed in claim 1, wherein the second resilient element is a compression spring.

14. The automatic water distributor as claimed in claim 1, wherein the water plug is made of plastic material.

15. The automatic water distributor as claimed in claim 1, wherein the valve core is away from the hole to form a slit defined between the valve core and the hole so as to communicate the first inlet with the first outflow cavity.

* * * * *